July 11, 1950           J. L. MAY           2,514,407
MOWER
Filed June 17, 1947           2 Sheets-Sheet 1
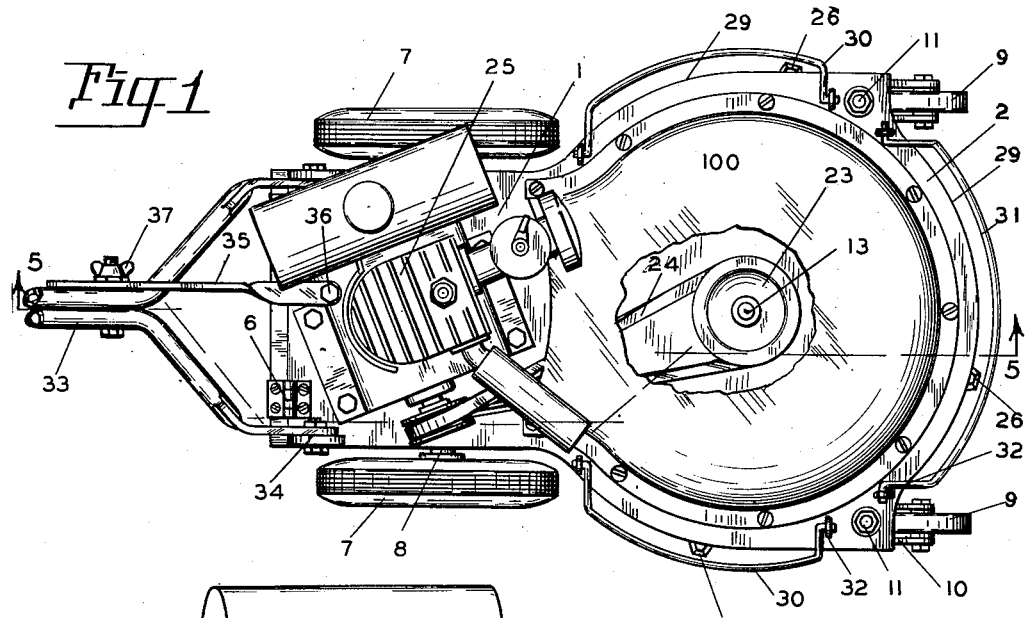
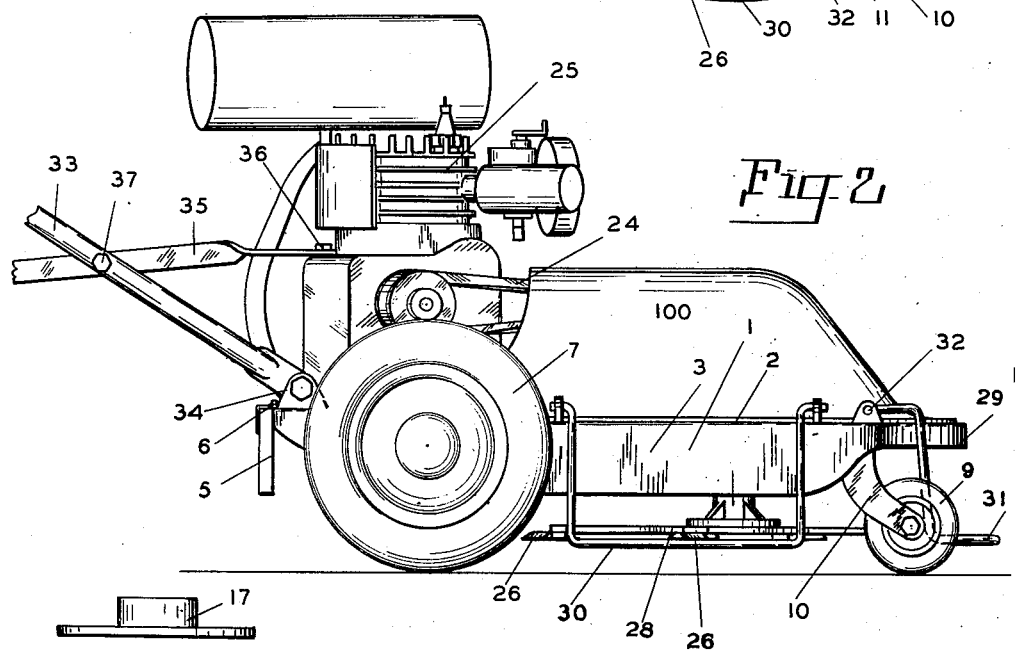
INVENTOR
JOSEPH L. MAY
BY
ATTORNEY July 11, 1950    J. L. MAY    2,514,407
MOWER
Filed June 17, 1947    2 Sheets-Sheet 2

INVENTOR
JOSEPH L. MAY
BY
ATTORNEY

Patented July 11, 1950

2,514,407

UNITED STATES PATENT OFFICE 2,514,407

MOWER

Joseph L. May, Portland, Oreg.

Application June 17, 1947, Serial No. 755,073

1 Claim. (Cl. 56—25.4)

This invention relates to mowers and the primary object of the invention is to design a mower having a cutting rotor working in a horizontal plane on a vertical axis, said rotor being driven by suitable power means as for instance a gas or electric motor.

A further object of the invention is to provide means of removing the cutter blades from the rotor and replacing the same with new blades.

A still further object of the invention is the mounting of the rotor underneath a frame, said frame being closed at the top and around the edges and mounted upon wheels.

Another object of the invention is to mount the cutting rotor and the supporting wheels relative to the frame so that the tips of the cutting blades will extend slightly beyond the said frame and wheels on the sides of the mower as well as on the forward end of the mower so that the same can trim the grass adjacent obstructions, such as trees and buildings.

A still further object of the invention is to provide movable guards to be used for protecting the operator and at the same time gauging the distance of the mower cutting blades so that they will not injure tree bases and the like.

These and other incidental objects will be apparent in the drawings, specifications and claim.

Referring to the drawings:

Figure 1 is a plan view of my new and improved mower, parts broken away for convenience of illustration.

Figure 2 is a side view of Figure 1.

Figure 3 is a detail view of the rotor mounting, partially broken away for convenience of illustration.

In the drawings:

Figure 4:
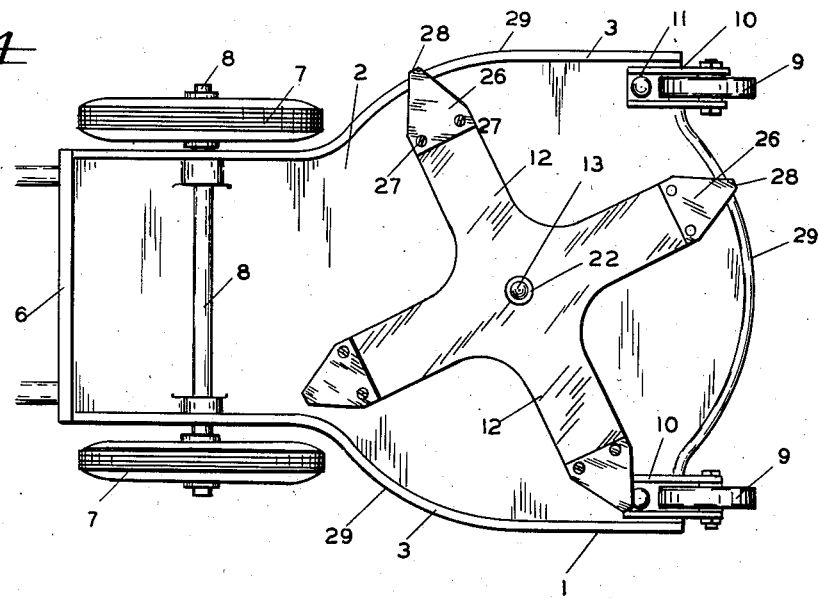
Figure 4 is an inverted plan view of the mower.
Figure 5:
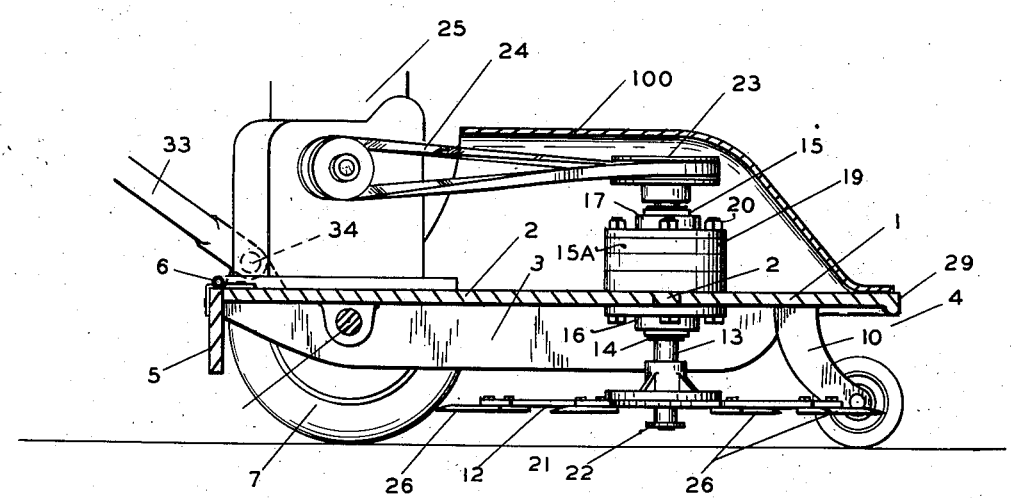
Figure 5 is a sectional view, taken on line 5—5 of Figure 1 looking in the direction indicated.

My new and improved mower consists of a frame 1 having a top 2 and side members 3. The forward part of the frame is open at 4 while the rear of the frame has a gate 5 hingedly secured to the top of the frame at 6. The rear of the frame is mounted on the wheels 7 through the axle 8, while the forward end of the frame is mounted upon the wheels 9 which are journalled within the forks 10, which in turn are bolted to the frame at 11. These forks are fixed permanently and do not rotate about their vertical axis, the object of the offset forks is for providing clearances for the rotor relative to the frame of the mower.

A rotor 12 is fixedly mounted to the vertical shaft 13 which is journalled within bearings 14 mounted within the tubular member 15. A flanged hub 16 is fixedly secured to the tubular member 15 while the flanged hub 17 is slidably mounted thereon. The tubular member 15 is inserted through the top 2 of the frame 1 extending upwardly through the spacer shims 15A. The hubs 14 and 17 are bolted thereon by the bolts 20 securing the whole assembly to the top 2 of the frame of the mower.

The rotor 12 may be adjusted up and down on the shaft 13 and locked in the desired position by the stud bolt 21. This provides for an adjustment of the rotor relative to the depth of cut of the grass being mowed. A safety retainer cap 22 is fixedly mounted to the lower end of the shaft 13 and prevents the rotor from coming off the shaft in the event the stud bolt 21 should become loose.

The shaft 13 has a pulley 23 keyed on its upper end which is driven by the belt 24 from the motor 25. Cutter blades 26 are mounted to the rotor 14 by bolts 27 and these cutter blades are interchangeable. The tips 28 extend slightly beyond the outer edge 29 of the frame of the machine so that they will cut the grass adjacent walls, sidewalks, trees and so forth. By using the forks 10 to mount the wheels 9 thereto the wheels will clear the ends 28 of the blades 26 of the rotor guards 30 and 31, which are pivotally mounted to the frame at 32. When they are folded down to the positions shown in Figures 1 and 2 they extend beyond the tips 28 of the blades acting as guards protecting the operator of the machine, but at the same time preventing the tips of the blades from cutting in to the base of trees and the like. In the event it is desired to cut the grass beyond the outer rim 29 of the frame, these guards are raised out of the way.

It will be noted that the wheels 7 are brought in so that they are within the cutting circle of the rotor. This is also true of the wheels 9, thereby eliminating rolling down the grass before it is cut. A handle 33 is pivotally mounted to the frame at 34 and is maintained in a fixed position by the brace 35 secured to the motor 25 at 36 and to the handle at 37. In the event it is desired to allow the handle to pivot about its pivot points 34 the bar 35 is disconnected from the handle at 37 allowing freedom of movement, but ordinarily it is desirable to have the handle held rigid in the operation of the mower.

I do not wish to be limited to the exact mechanical structure, as other mechanical equivalents may be substituted still coming within the scope of my claim.

What I claim is:

A mower comprising a frame, rollers adjacent the sides of and supporting said frame for mobility and located beyond the periphery of the frame, a vertically disposed shaft journalled on said frame substantially midway between the sides of the frame, a rotor fixed to said shaft, mower blades carried by said rotor and extending through an area beyond the front and sides of said frame but short of said rollers and laterally beyond the paths of said rollers, means for driving said shaft to rotate said rotor and revolve said mower blades, and guards carried by said frame at the front and sides thereof and extending between said rollers, said guards being pivotally mounted on said frame for movement between positions beyond and substantially level with the ends of said mower blades and positions above said frame.

JOSEPH L. MAY.

REFERENCES CITED

The following references are of record in the file of this patent:

UNITED STATES PATENTS

| Number | Name | Date |
| --- | --- | --- |
| 1,805,927 | Sharp | May 19, 1931 |
| 1,992,494 | Lundin | Feb. 26, 1935 |
| 2,134,115 | Flammang | Oct. 25, 1938 |
| 2,287,126 | Packwood | June 23, 1942 |